(12) United States Patent
Fulbright

(10) Patent No.: US 12,522,367 B2
(45) Date of Patent: Jan. 13, 2026

(54) EXPANDABLE DRONE

(71) Applicant: University of South Carolina, Columbia, SC (US)

(72) Inventor: Ron Fulbright, Spartanburg, SC (US)

(73) Assignee: University of South Carolina, Columbia, SC (US)

( * ) Notice: Subject to any disclaimer, the term of this patent is extended or adjusted under 35 U.S.C. 154(b) by 0 days.

(21) Appl. No.: 18/459,622

(22) Filed: Sep. 1, 2023

(65) Prior Publication Data

US 2024/0076051 A1    Mar. 7, 2024

Related U.S. Application Data

(60) Provisional application No. 63/403,347, filed on Sep. 2, 2022.

(51) Int. Cl.
*B64D 29/06* (2006.01)
*B64U 20/40* (2023.01)
*B64U 20/87* (2023.01)

(52) U.S. Cl.
CPC ............ *B64D 29/06* (2013.01); *B64U 20/40* (2023.01); *B64U 20/87* (2023.01)

(58) Field of Classification Search
CPC ......... B64D 29/06; B64U 20/40; B64U 10/13
See application file for complete search history.

(56) References Cited

U.S. PATENT DOCUMENTS

| | | | |
|---|---|---|---|
| 2012/0158215 A1* | 6/2012 | Sun | B64C 37/02 701/1 |
| 2014/0374532 A1* | 12/2014 | Duffy | G05D 1/104 244/2 |
| 2016/0378108 A1* | 12/2016 | Paczan | B64U 30/20 705/330 |
| 2017/0233072 A1* | 8/2017 | Chang | B64U 50/18 244/2 |
| 2022/0063802 A1* | 3/2022 | Komerath | B64U 30/10 |
| 2023/0017711 A1* | 1/2023 | Garanger | B64U 30/20 |

* cited by examiner

*Primary Examiner* — Kimberly S Berona
*Assistant Examiner* — Steven J Shur
(74) *Attorney, Agent, or Firm* — Offit Kurman; Douglas L. Lineberry

(57) ABSTRACT

Described herein are drone designs, and methods for making same, wherein drones are constructed from interlocking modular nacelles of different types allowing nacelles to be added as needed to increase payload capacity, flight time, and mission capability as the application requires. The modular nacelles can be attached together into an aggregate structure, called a collective, as desired to yield an infinitely expandable and extensible drone. Since each nacelle includes its own battery, nacelles can be added as needed to achieve whatever capability is needed for the application at hand without having to customize the design of the drone.

20 Claims, 8 Drawing Sheets

EXPANDABLE DRONE

TECHNICAL FIELD

The subject matter disclosed herein is generally directed to drone designs, and methods for making same, wherein drones are constructed from interlocking modular nacelles of different types allowing nacelles to be added as needed to increase payload capacity, flight time, and mission capability as the application requires. The modular nacelles can be attached together into an aggregate structure, called a collective, as desired to yield an infinitely expandable and extensible drone. Since each nacelle includes its own battery, nacelles can be added as needed to achieve whatever capability is needed for the application at hand without having to customize the design of the drone.

BACKGROUND

Although many different styles and designs exist, unmanned aerial vehicles (UAVs), commonly referred to as "drones," meant for consumer and commercial use typically consist of a main body from which multiple rotor assemblies extend. Usually, the main body contains one or more batteries, a control system, transceivers, sensors, and various hardware. The rotor assemblies (nacelles) usually consist of one or more motors and one or more rotor blades with electrical connections back to the batteries and control system in the main body. When spinning, the rotors displace a volume of air providing lift to the drone. The amount of air displaced, along with the force with which it is displaced, determines the lifting capacity (or payload capacity) of the drone. In general, more rotors and higher rotational speed of the rotors yield greater lifting capacity. An electrically powered drone can fly until its batteries are expended. Flight time is a function of battery capacity and power consumption where the number of rotors and the weight being lifted are key factors. In general, the more battery capacity a drone has, the longer the flight time.

A drone with more than one rotor nacelle is generically called a multirotor or multicopter. A drone with four rotors is called a quadcopter or quadrotor, eight rotors is called an octocopter, etc. Multiple rotors give drones greater maneuverability and increased lifting capacity. However, more motors consume electrical power faster. Motors expending more work because of heavier payloads also consume electrical power faster. Therefore, more rotors and a higher payload capacity require more batteries. However, in a typical design, there is limited space within the main body of the drone for additional batteries. A breakeven point is eventually reached at which the design has the greatest number of rotors possible yielding a maximum lifting capacity at a maximum flight time for that design. Therefore, existing drone designs are limited in configurability, expandability, and customizability and do not usually match mission requirements efficiently, unless specifically designed to do so. Further, custom designing a drone for each new application is cost prohibitive.

However, given the static nature of drone constructs, what is needed is a more versatile system for allowing drones to be customized to particular payloads and/or work requirements. Drones are needed with are expandable, configurable, and extensible. Accordingly, it is an object of the present disclosure to a novel drone design constructed from interlocking modular nacelles of different types allowing nacelles to be added as needed to increase payload capacity, flight time, and mission capability Citation or identification of any document in this application is not an admission that such a document is available as prior art to the present disclosure.

SUMMARY

The above objectives are accomplished according to the present disclosure by providing in one instance a modular drone. The modular drone may include at least one modular rotor nacelle that may include a rotor nacelle housing that may include at least one rotor, at least one motor in communication with and powering the at least one rotor and connected to the rotor nacelle housing, at least one rotor nacelle connector formed on a periphery of the rotor nacelle housing for connecting the at least one modular rotor nacelle to at least one other modular nacelle. The drone may also include at least one modular battery nacelle that may include a battery nacelle housing that includes at least one battery affixed to the at least one battery nacelle housing, at least one battery nacelle connector formed on a periphery of the battery nacelle housing for connecting the at least one modular battery nacelle to the at least one rotor nacelle housing and configured so that the at least one modular battery nacelle provides power to the at least one modular rotor nacelle. The done may also include at least one modular control nacelle that may include a control nacelle housing that may include at least one GPS receiver affixed to the at least one control nacelle housing and at least one control nacelle connector is formed on a periphery of the control nacelle housing for connecting the at least one modular control nacelle to the at least one modular rotor nacelle or the at least one battery nacelle and configured to allow the at least one modular control to be powered by the at least one modular battery nacelle and to transmit at least one command to the at least one modular rotor nacelle.

Further, the rotor nacelle housing, the battery nacelle housing, and the modular control nacelle housing may all define a polygon shape as a periphery of the rotor nacelle housing, the battery nacelle housing, and the modular control nacelle housing. Still yet, the drone may include at least one modular utility nacelle. The at least one modular utility nacelle may include at least one utility nacelle housing further comprising, at least one camera affixed to the at least one modular utility nacelle housing, at least one utility nacelle connector formed on a periphery of the at least one modular utility nacelle for connecting the at least one modular utility nacelle to either the modular rotor nacelle, the at least one modular battery nacelle, or the at least one modular control nacelle; and the at least one utility nacelle connector may be configured to receive power from the at least one modular battery nacelle, receive at least one command from the at least one modular command nacelle, and affix the at least one modular utility nacelle to the at least one modular rotor nacelle. Again, the drone may include at least two modular rotor nacelles. Further still, the drone may include at least two modular command nacelles. Further yet, the drone may include at least two modular battery nacelles. Further still, the drone may include at least one modular control nacelle with at least one modular rotor nacelle affixed to every side of the control nacelle housing. Still yet further, the drone may include at least two modular rotor nacelles wherein a first of the at least two modular rotor nacelles is affixed to the at least one control nacelle and a second of the at least two modular rotor nacelles is connected to the first of the at least two motor nacelles but not connected to the at least one control nacelle. Still further again, the at least one modular command nacelle may include at least one environmental sensor, at least one transponder, at least one data transceiver, at least one radio transceiver, at least one computer control component, or at least one altitude sensor. Moreover, the at least one modular utility nacelle may include at least one camera support and at least one camera gimble.

In a further instance, the current disclosure provides a method for forming a modular drone. The method may include forming at least one modular rotor nacelle and configuring the at least one modular rotor nacelle to include a rotor nacelle housing that may include at least one rotor, at least one motor in communication with and powering the at least one rotor and connected to the rotor nacelle housing, at least one rotor nacelle connector formed on a periphery of the nacelle housing configured to connect the at least one modular rotor nacelle to at least one other modular nacelle. The method may also include forming at least one modular battery nacelle to include a battery nacelle housing that may include at least one battery affixed to the at least one battery nacelle housing, at least one battery nacelle connector formed on a periphery of the battery nacelle housing for connecting the at least one modular battery nacelle to the at least one rotor nacelle housing and configured so that the at least one modular battery nacelle provides power to the at least one modular rotor nacelle. The method may also include forming at least one modular control nacelle, which may include a control nacelle housing that may include at least one GPS receiver affixed to the at least one control nacelle housing; and at least one control nacelle connector formed on a periphery of the control nacelle housing for connecting the at least one modular control nacelle to the at least one modular rotor nacelle or the at least one battery nacelle and configured to allow the at least one modular control to be powered by the at least one modular battery nacelle and to send at least one command to the at least one modular rotor nacelle; and wherein the at least one modular rotor nacelle, the at least one modular battery nacelle, and the at least one modular control nacelle may be connected to at least one other of the remaining nacelles. Further, the method may include configuring the rotor nacelle housing, the battery nacelle housing, and the control nacelle housing to define a polygon shape as a periphery of the rotor nacelle housing, the battery nacelle housing, and the control nacelle housing. Further, the method may include forming at least one modular utility nacelle that may include at least one utility nacelle housing that may include at least one camera affixed to the at least one modular utility nacelle housing, at least one utility nacelle connector formed on a periphery of the at least one modular utility nacelle for connecting the at least one modular utility nacelle to either the at least one modular rotor nacelle, the at least one modular battery nacelle, or the at least one modular control nacelle; and the at least one utility nacelle connector may be configured to receive power from the at least one modular battery nacelle, receive at least one command from the at least one modular command nacelle, and affix the at least one modular utility nacelle to the at least one modular rotor nacelle, the at least one modular battery nacelle, or the at least one modular control nacelle.

Further, the method may include configuring the modular drone to include at least two modular rotor nacelles. Additionally, the method may include configuring the modular drone to include at least two modular command nacelles. Still yet, the method may include configuring the modular drone to include at least two modular battery nacelles. Still yet further, the method may include configuring the at least one modular control nacelle with at least one modular rotor nacelle affixed to every side of the control nacelle housing. Further again, the method may include configuring at least two modular rotor nacelles wherein a first of the at least two modular rotor nacelles is affixed to the at least one control nacelle and a second of the at least two modular rotor nacelles is connected to the first of the at least two motor nacelles but not connected to the at least one modular control nacelle. Moreover, the method may include configuring the at least one modular command nacelle to include at least one environmental sensor, at least one transponder, at least one data transceiver, at least one radio transceiver, at least one computer control component, or at least one altitude sensor. Still yet further, the method may include configuring the at least one modular utility nacelle to include at least one camera support and at least one camera gimble These and other aspects, objects, features, and advantages of the example embodiments will become apparent to those having ordinary skill in the art upon consideration of the following detailed description of example embodiments.

BRIEF DESCRIPTION OF THE DRAWINGS

An understanding of the features and advantages of the present disclosure will be obtained by reference to the following detailed description that sets forth illustrative embodiments, in which the principles of the disclosure may be utilized, and the accompanying drawings of which.

Figure 1:
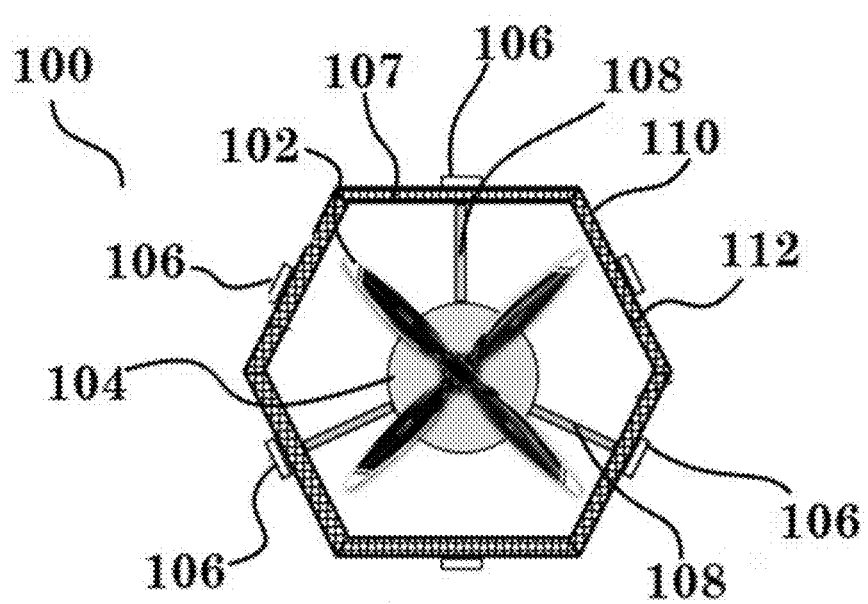
FIG. 1 shows one embodiment of a modular rotor nacelle of the current disclosure.

The figures herein are for illustrative purposes only and are not necessarily drawn to scale.

DETAILED DESCRIPTION OF THE EXAMPLE EMBODIMENTS

Before the present disclosure is described in greater detail, it is to be understood that this disclosure is not limited to particular embodiments described, and as such may, of course, vary. It is also to be understood that the terminology used herein is for the purpose of describing particular embodiments only, and is not intended to be limiting.

Unless specifically stated, terms and phrases used in this document, and variations thereof, unless otherwise expressly stated, should be construed as open ended as opposed to limiting. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise.

Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, the preferred methods and materials are now described.

All publications and patents cited in this specification are cited to disclose and describe the methods and/or materials in connection with which the publications are cited. All such publications and patents are herein incorporated by references as if each individual publication or patent were specifically and individually indicated to be incorporated by reference. Such incorporation by reference is expressly limited to the methods and/or materials described in the cited publications and patents and does not extend to any lexicographical definitions from the cited publications and patents. Any lexicographical definition in the publications and patents cited that is not also expressly repeated in the instant application should not be treated as such and should not be read as defining any terms appearing in the accompanying claims. The citation of any publication is for its disclosure prior to the filing date and should not be construed as an admission that the present disclosure is not entitled to antedate such publication by virtue of prior disclosure. Further, the dates of publication provided could be different from the actual publication dates that may need to be independently confirmed.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure. Any recited method can be carried out in the order of events recited or in any other order that is logically possible.

Where a range is expressed, a further embodiment includes from the one particular value and/or to the other particular value. The recitation of numerical ranges by endpoints includes all numbers and fractions subsumed within the respective ranges, as well as the recited endpoints. Where a range of values is provided, it is understood that each intervening value, to the tenth of the unit of the lower limit unless the context clearly dictates otherwise, between the upper and lower limit of that range and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure. For example, where the stated range includes one or both of the limits, ranges excluding either or both of those included limits are also included in the disclosure, e.g. the phrase "x to y" includes the range from 'x' to 'y' as well as the range greater than 'x' and less than 'y'. The range can also be expressed as an upper limit, e.g. 'about x, y, z, or less' and should be interpreted to include the specific ranges of 'about x', 'about y', and 'about z' as well as the ranges of 'less than x', less than y', and 'less than z'. Likewise, the phrase 'about x, y, z, or greater' should be interpreted to include the specific ranges of 'about x', 'about y', and 'about z' as well as the ranges of 'greater than x', greater than y', and 'greater than z'. In addition, the phrase "about 'x' to 'y'", where 'x' and 'y' are numerical values, includes "about 'x' to about 'y'".

It should be noted that ratios, concentrations, amounts, and other numerical data can be expressed herein in a range format. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. Ranges can be expressed herein as from "about" one particular value, and/or to "about" another particular value. Similarly, when values are expressed as approximations, by use of the antecedent "about," it will be understood that the particular value forms a further aspect. For example, if the value "about 10" is disclosed, then "10" is also disclosed.

It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a numerical range of "about 0.1% to 5%" should be interpreted to include not only the explicitly recited values of about 0.1% to about 5%, but also include individual values (e.g., about 1%, about 2%, about 3%, and about 4%) and the sub-ranges (e.g., about 0.5% to about 1.1%; about 5% to about 2.4%; about 0.5% to about 3.2%, and about 0.5% to about 4.4%, and other possible sub-ranges) within the indicated range.

As used herein, the singular forms "a", "an", and "the" include both singular and plural referents unless the context clearly dictates otherwise.

As used herein, "about," "approximately," "substantially," and the like, when used in connection with a measurable variable such as a parameter, an amount, a temporal duration, and the like, are meant to encompass variations of and from the specified value including those within experimental error (which can be determined by e.g. given data set, art accepted standard, and/or with e.g. a given confidence interval (e.g. 90%, 95%, or more confidence interval from the mean), such as variations of +/−10% or less, +/−5% or less, +/−1% or less, and +/−0.1% or less of and from the specified value, insofar such variations are appropriate to perform in the disclosure. As used herein, the terms "about," "approximate," "at or about," and "substantially" can mean that the amount or value in question can be the exact value or a value that provides equivalent results or effects as recited in the claims or taught herein. That is, it is understood that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art such that equivalent results or effects are obtained. In some circumstances, the value that provides equivalent results or effects cannot be reasonably determined. In general, an amount, size, formulation, parameter or other quantity or characteristic is "about," "approximate," or "at or about" whether or not expressly stated to be such. It is understood that where "about," "approximate," or "at or about" is used before a quantitative value, the parameter also includes the specific quantitative value itself, unless specifically stated otherwise.

The term "optional" or "optionally" means that the subsequent described event, circumstance or substituent may or may not occur, and that the description includes instances where the event or circumstance occurs and instances where it does not.

As used interchangeably herein, the terms "sufficient" and "effective," can refer to an amount (e.g. mass, volume, dosage, concentration, and/or time period) needed to achieve one or more desired and/or stated result(s). For example, a therapeutically effective amount refers to an amount needed to achieve one or more therapeutic effects.

As used herein, "tangible medium of expression" refers to a medium that is physically tangible or accessible and is not a mere abstract thought or an unrecorded spoken word. "Tangible medium of expression" includes, but is not limited to, words on a cellulosic or plastic material, or data stored in a suitable computer readable memory form. The data can be stored on a unit device, such as a flash memory or CD-ROM or on a server that can be accessed by a user via, e.g. a web interface.

Various embodiments are described hereinafter. It should be noted that the specific embodiments are not intended as an exhaustive description or as a limitation to the broader aspects discussed herein. One aspect described in conjunction with a particular embodiment is not necessarily limited to that embodiment and can be practiced with any other embodiment(s). Reference throughout this specification to "one embodiment", "an embodiment," "an example embodiment," means that a particular feature, structure or characteristic described in connection with the embodiment is included in at least one embodiment of the present disclosure. Thus, appearances of the phrases "in one embodiment," "in an embodiment," or "an example embodiment" in various places throughout this specification are not necessarily all referring to the same embodiment, but may. Furthermore, the particular features, structures or characteristics may be combined in any suitable manner, as would be apparent to a person skilled in the art from this disclosure, in one or more embodiments. Furthermore, while some embodiments described herein include some but not other features included in other embodiments, combinations of features of different embodiments are meant to be within the scope of the disclosure. For example, in the appended claims, any of the claimed embodiments can be used in any combination.

All patents, patent applications, published applications, and publications, databases, websites and other published materials cited herein are hereby incorporated by reference to the same extent as though each individual publication, published patent document, or patent application was specifically and individually indicated as being incorporated by reference.

KITS

Any of the drones and methods for making/customizing same described herein can be presented as a combination kit. As used herein, the terms "combination kit" or "kit of parts" refers to the drones, parts, controls, repair materials and any additional components that are used to package, sell, market, deliver, and/or provide the drone and allow customizability of same, these may include, but are not limited to, packaging, tools, instructions, parts, and the like. When one or more of the drones and methods for making/customizing same described herein or a combination thereof are provided simultaneously, the combination kit can contain the active drone in a single configuration, along with tools, directions, and instructions for customizing same. When the drones and methods for making/customizing same described herein or a combination thereof and/or kit components are not provided simultaneously, the combination kit can contain the drone, tools, directions, and instructions for customizing same separately. The separate kit components can be contained in a single package or in separate packages within the kit.

In some embodiments, the combination kit also includes instructions/directions printed on or otherwise contained in a tangible medium of expression. The instructions/directions can provide information regarding the drone, operation of same, instructions on how to customize the drone, repair and maintenance instructions, etc. In some embodiments, the instructions/directions can provide directions/instructions for operating the drone and customizing same for particular lift loads/applications. In some embodiments, the instructions can provide one or more embodiments of the methods, or drones formed thereof, such as any of the methods described in greater detail elsewhere herein.

FIG. 1 shows a modular rotor nacelle 100 of the current disclosure. Modular rotor nacelle 100 may include rotor 102, motor 104 for powering rotor 102, connectors 106 for affixing nacelles of various types to one another, motor support 108 and a nacelle housing 110 that may house battery 112. Battery 112 for modular rotor nacelle 100 may be distributed throughout the six components comprising nacelle housing 110. Motor 104 may be secured by motor supports 108 and spins rotor 102. Connector 106 allows modular rotor nacelle 100 to be attached to neighboring nacelles. Connector 106 may be formed on outer periphery wall 107 of a drone and is configured to engage another connector 106, as described herein, which may be of varied shapes as also described herein.

Figure 2:
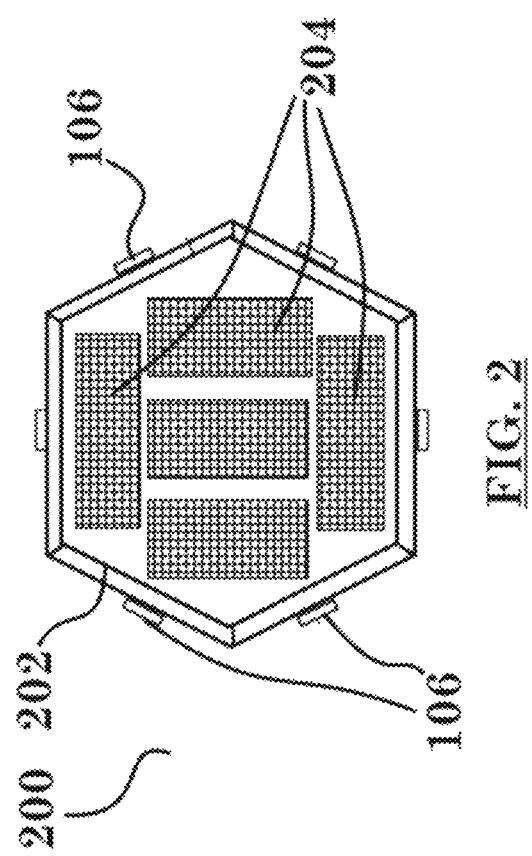
FIG. 2 shows one embodiment of a modular battery nacelle of the current disclosure.

FIG. 2 shows a battery nacelle 200 of the current disclosure. Battery nacelle 200 may include batter nacelle housing 202, connector 106, and at least one modular battery 204. Battery Nacelle 200 may contain only modular batteries 204 (and not motor 104 or rotor 102). The purpose of battery nacelle 200 is providing electrical power to other battery nacelles 200 connected throughout the drone body. Although five (5) batteries are shown in FIG. 2, the number and configuration of batteries can vary depending on design of the batteries themselves. While not intended to be limiting, lithium polymer (LiPo) batteries may be employed.

Figure 3:
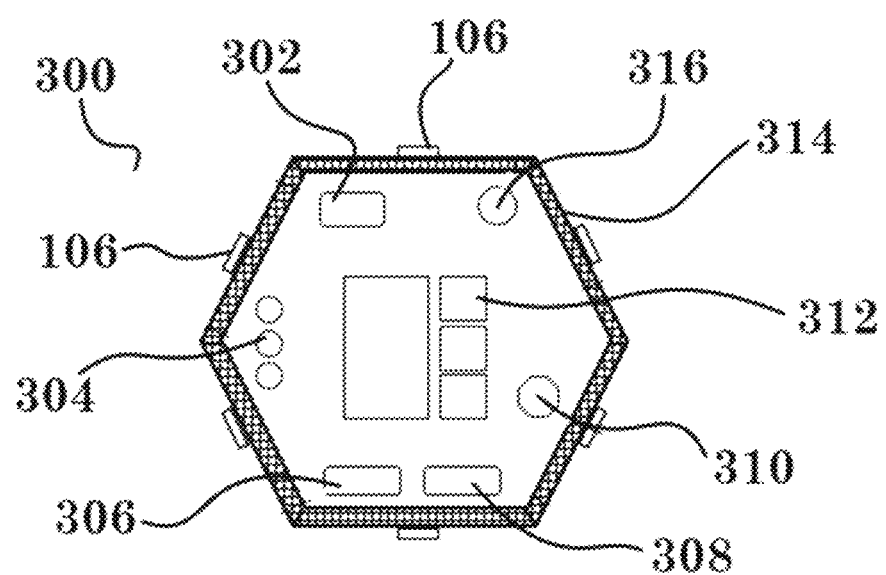
FIG. 3 shows one embodiment of a modular control nacelle of the current disclosure.

FIG. 3 shows one embodiment of a modular control nacelle 300. Modular control nacelle 300 may include GPS receiver 302, environmental sensors 304, connectors 106, transponder 306, satellite/cellular data transceivers 308, radio transceiver 310, computer control components 312 such as flight control systems, tactical control systems, unmanned vehicle control systems and/or data storage elements, a control nacelle housing 314, and altitude sensor 316. Modular control nacelle 300 may contain any computer control system components, sensors, radio/satellite transceivers, transponders, etc., needed for navigation, control, and operation of the drone. While several typical elements are shown, others may be included as needed.

Figure 4A:
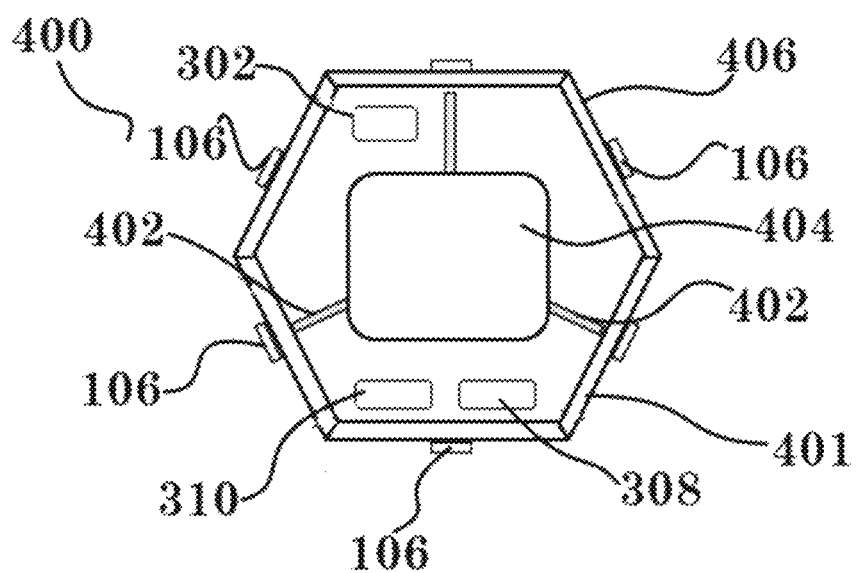
FIG. 4A shows a top view of one embodiment of a camera/utility nacelle of the current disclosure.
Figure 4B:
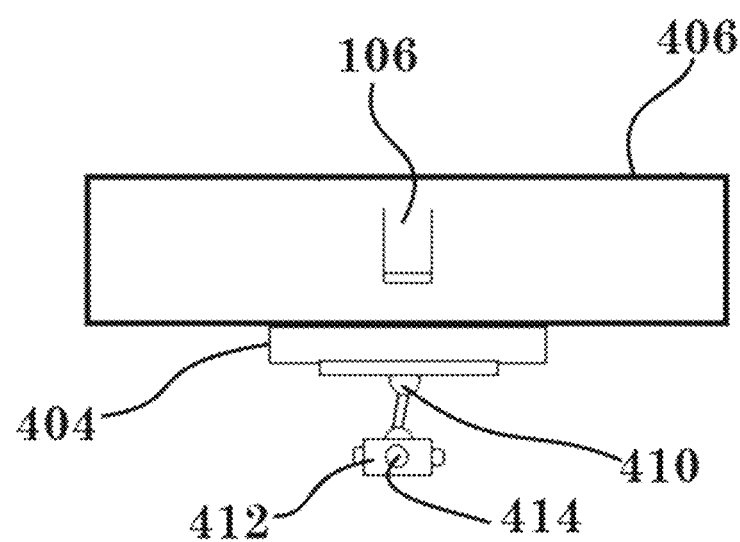
FIG. 4B shows a side view of one embodiment of a camera/utility nacelle of the current disclosure.

FIG. 4A shows utility nacelle 400, which in one instance may be a camera nacelle 401, in this case a nacelle housing a camera 412, see FIG. 4B. Utility nacelle 400 may include GPS receiver 302, camera support 402, connectors 106, radio transceiver 310, satellite/cellular data transceiver 308, camera controller 402, and camera/utility nacelle housing 404. FIG. 4B shows a side view of utility nacelle 400, which may include camera gimble 410, which allows camera 412 to rotate about an axis as well as may cooperate with camera controller 404 to position, reposition, or orient camera 412, and lens 414. Utility nacelle 400 may contain components needed for the drone to perform intended mission. As FIGS. 4A and 4B shows, this could be a camera, infrared detection device, motion sensor, etc., however, any type of component could be included.

Figure 5:
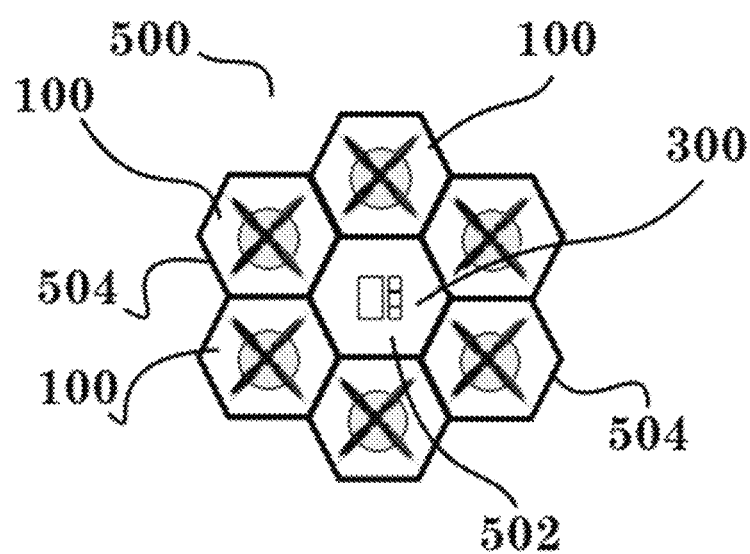
FIG. 5 shows one example of a drone of the current disclosure constructed from modular nacelles.

FIG. 5 shows one possible embodiment of modular drone 500 constructed from a plurality of modular rotor nacelles 100 at periphery nacelle positions 504 and a central modular control nacelle 300 at central nacelle position 502. While six (6) modular rotor nacelles are shown, more or less modular rotor nacelles 100 are contemplated and hereby disclosed via the current disclosure such as 1, 2, 3, 4, 6, 7, etc. Moreover, while modular control nacelle 300 is shown as central nacelle 502 and modular rotor nacelles are shown at periphery nacelle positions 504, nacelle placement is not so limited. The current disclosure should be construed to allow placement of central nacelle 502 at any position available on modular drone 500 as well as placement of modular rotor nacelle 300 at any position on modular drone 500.

Figure 6:
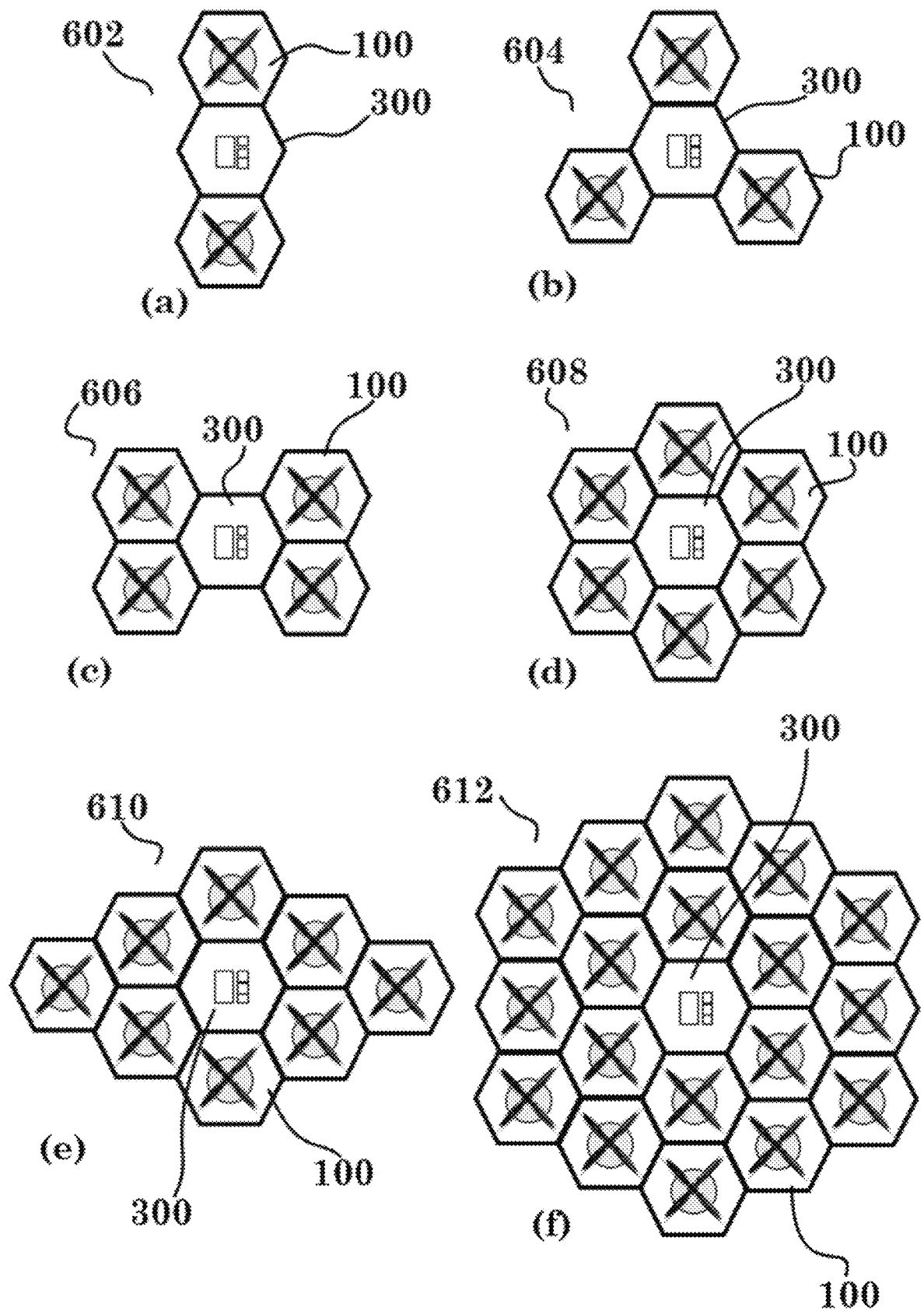
FIG. 6 shows various possible configurations of drones of the current disclosure.

FIG. 6 shows various modular drone configurations possible via the current disclosure. For instance, FIG. 6 shows at: (a) a bicopter configuration 602 with one modular control nacelle 300 and two modular rotor nacelles 100; (b) a tricopter configuration 604 with one modular control nacelle 300 and three modular rotor nacelles 100; (c) a quadcopter configuration 606 with one modular control nacelle 300 and four modular rotor nacelles 100; (d) a hexcopter configuration 608 with one modular control nacelle 300 and six modular rotor nacelles 100; (e) an octacopter configuration 610 with one modular control nacelle 300 and eight modular rotor nacelles 100; and (f) an octodec configuration 610 with one modular control nacelle 300 and eighteen modular rotor nacelles 100. As the various configurations illustration, the current disclosure provides a plethora of drone combinations via use of multiple different nacelles and multiple possible positions for same.

Figure 7:
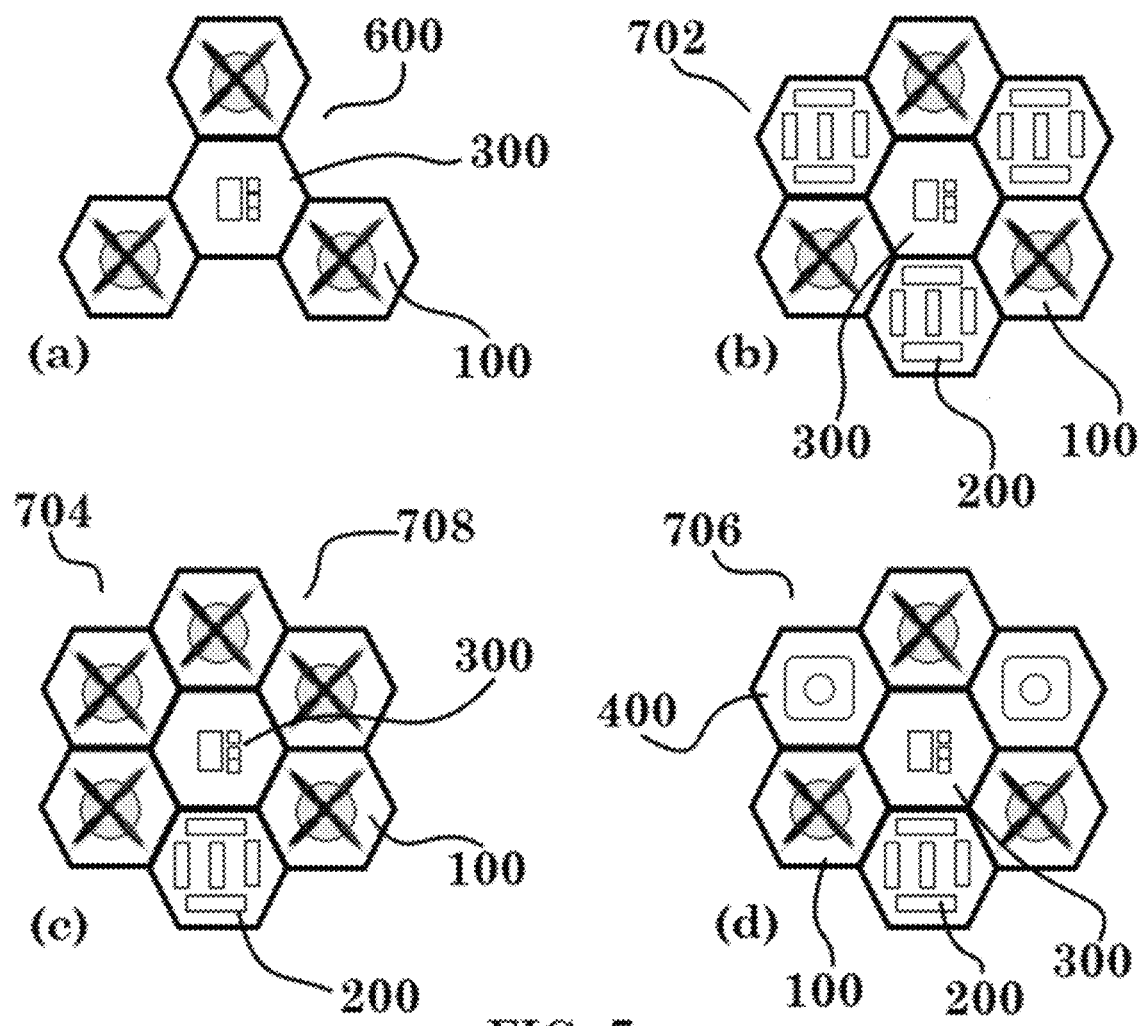
FIG. 7 shows examples of modular drone extensibility for drones of the current disclosure.

FIG. 7 shows further possible drone configurations of the present disclosure. For instance, FIG. 7 shows at: (a) a tricopter configuration 600; (b) a first modified tricopter configuration 702 employing one modular control nacelle 300, three rotor nacelles 100, and three battery nacelles 200 to greatly increase flight time; (c) a pentacopter configuration 704 employing one modular control nacelle 100, one battery nacelle 200, and five modular rotor nacelles 100 to increase both flight time and lifting capacity; and (d) a second modified tricopter configuration 706 employing one modular control nodule 300, three modular rotor nacelles 100, two utility nacelles 400 (each with a camera), and one modular battery nacelle 200 for increasing both flight time and mission capability.

Provided herein is a novel drone design constructed from interlocking modular nacelles of different types allowing nacelles to be added as needed to increase payload capacity, flight time, and mission capability as the application requires as shown in FIGS. 5-7. The modular nacelles can be attached together into an aggregate structure, called a collective 708, as desired to yield an infinitely expandable and extensible drone. Since each nacelle includes its own battery 112, nacelles can be added as needed to achieve whatever capability is needed for the application at hand without having to customize the design of the drone.

Types of nacelles include (but are not limited to): control nacelles 300, rotor nacelles 100, battery nacelles 200, camera nacelles 401, and utility nacelles 400. A control nacelle 300 contains the computer systems, sensors, transceivers, and batteries needed to control and navigate the drone as shown in FIG. 3. Each rotor nacelle 100 contains the motor(s), rotor(s), and batteries to power the nacelle as shown in FIG. 1. Each camera nacelle 401 contains the camera, control hardware, data storage, sensors, transceivers, and batteries required to operate and control the camera equipment as shown in FIG. 4. Each battery nacelle 200 contains multiple battery modules, when connected to other nacelles, provides electrical power to all components in the collective as shown in FIG. 2.

In general, as shown in FIGS. 1-4, a modular nacelle is composed of a hexagonal housing consisting of six panels. However, the housing may be of any particular shape that lends itself into releasably connecting modules to one another and disassembling same to reassemble in new configurations, such as polygon, circular, varied shapes, etc. The batteries powering the components in the nacelle are housed within the six panels. In essence, the batteries themselves form the hexagonal housing for the nacelle. A connector on the face of each panel (each side of the hexagon) allows one nacelle to be easily attached to another nacelle. These connectors may be frictional, VELCRO®, male/female, removable adhesives, magnetic, etc., as known to those of skill in the art. When attached, the nacelles are secure and will not come apart during flight or other drone operations. An attendant can easily disconnect a nacelle via interaction with the connectors. Thus, nacelles can be quickly added to the drone at will and as needed to perform the mission. Furthermore, a drone can be reconfigured in minutes simply by adding, removing, or exchanging nacelles of different types.

For example, adding additional rotor nacelles 100 increases the payload capacity as is shown in FIG. 7. Adding battery nacelles increases flight time as shown in FIG. 7. Adding camera modules 401 and/or other utility modules 400 increases mission capability as shown in FIG. 7. Combining different numbers of rotor nacelles 100 results in different basic configurations: bicopter, tricopter, quadcopter, hexacopter, etc., as shown in FIG. 6. An 18-rotor octadec drone configuration is shown in FIG. 6 as well by encircling the control nacelle with two layers of rotor nacelles 100. Indeed, more rotor nacelles 100 could be added to provide further improvements. Since each rotor nacelle 100 adds its own battery power, there is no theoretical limit to the number of rotor nacelles 100 used. However, each nacelle increases the overall footprint and total weight of the drone. Practical and logistical limitations may dictate size and therefore the number of rotor nacelles or other nacelles employed.

Various modifications and variations of the described methods, drones, and kits of the disclosure will be apparent to those skilled in the art without departing from the scope and spirit of the disclosure. Although the disclosure has been described in connection with specific embodiments, it will be understood that it is capable of further modifications and that the disclosure as claimed should not be unduly limited to such specific embodiments. Indeed, various modifications of the described modes for carrying out the disclosure that are obvious to those skilled in the art are intended to be within the scope of the disclosure. This application is intended to cover any variations, uses, or adaptations of the disclosure following, in general, the principles of the disclosure and including such departures from the present disclosure come within known customary practice within the art to which the disclosure pertains and may be applied to the essential features herein before set forth.

What is claimed is:

1. A modular drone comprising:
    at least one modular rotor nacelle comprising: a rotor nacelle housing further comprising:
        at least one rotor;
        at least one motor in communication with and powering the at least one rotor and connected to the rotor nacelle housing;
        at least one rotor nacelle connector formed on a periphery of the rotor nacelle housing for connecting the at least one modular rotor nacelle to at least one other modular nacelle;
    at least one modular battery nacelle comprising;
        a battery nacelle housing further comprising:
            at least one battery affixed to the at least one battery nacelle housing;
            at least one battery nacelle connector formed on a periphery of the battery nacelle housing for connecting the at least one modular battery nacelle to the at least one rotor nacelle housing and configured so that the at least one modular battery nacelle provides power to the at least one modular rotor nacelle;
    at least one modular control nacelle comprising;
        a control nacelle housing further comprising:
            at least one GPS receiver affixed to the at least one control nacelle housing;
            at least one control nacelle connector formed on a periphery of the control nacelle housing for connecting the at least one modular control nacelle to the at least one modular rotor nacelle or the at least one battery nacelle and configured to allow the at least one modular control to be powered by the at least one modular battery nacelle and to transmit at least one command to the at least one modular rotor nacelle; and
    wherein the at least one modular rotor nacelle, the at least one modular battery nacelle, and the at least one modular control nacelle do not have identical components nor do they have identical function with respect to one another.

2. The modular drone of claim 1, wherein the rotor nacelle housing, the battery nacelle housing, and the modular control nacelle housing all define a polygon shape as a periphery of the rotor nacelle housing, the battery nacelle housing, and the modular control nacelle housing.

3. The modular drone of claim 1, further comprising:
    at least one modular utility nacelle comprising;
        at least one utility nacelle housing further comprising;
        at least one camera affixed to the at least one modular utility nacelle housing;
        at least one utility nacelle connector formed on a periphery of the at least one modular utility nacelle for connecting the at least one modular utility nacelle to either the modular rotor nacelle, the at least one modular battery nacelle, or the at least one modular control nacelle; and
        the at least one utility nacelle connector configured to:
            receive power from the at least one modular battery nacelle; and
            receive at least one command from the at least one modular command nacelle.

4. The modular drone of claim 1, further comprising at least two modular rotor nacelles.

5. The modular drone of claim 1, further comprising at least two modular command nacelles.

6. The modular drone of claim 1, further comprising at least two modular battery nacelles.

7. The modular drone of claim 2, further comprising the at least one modular control nacelle with at least one modular rotor nacelle affixed to every side of the control nacelle housing.

8. The modular drone of claim 1, further comprising at least two modular rotor nacelles wherein a first of the at least two modular rotor nacelles is affixed to the at least one control nacelle and a second of the at least two modular rotor nacelles is connected to the first of the at least two motor nacelles but not connected to the at least one control nacelle.

9. The modular drone of claim 1, wherein the at least one modular command nacelle includes at least one environmental sensor, at least one transponder, at least one data transceiver, at least one radio transceiver, at least one computer control component, or at least one altitude sensor.

10. The modular drone of claim 3, wherein the at least one modular utility nacelle further comprises at least one camera support and at least one camera gimble.

11. A method for forming a modular drone comprising:
    forming at least one modular rotor nacelle and configuring the at least one modular rotor nacelle to include:
        a rotor nacelle housing further comprising:
            at least one rotor;
            at least one motor in communication with and powering the at least one rotor and connected to the rotor nacelle housing;
            at least one rotor nacelle connector formed on a periphery of the nacelle housing configured to connect the at least one modular rotor nacelle to at least one other modular nacelle;
    forming at least one modular battery nacelle and configuring the at least one modular battery nacelle to include;
        a battery nacelle housing further comprising:
            at least one battery affixed to the at least one battery nacelle housing;
            at least one battery nacelle connector formed on a periphery of the battery nacelle housing for connecting the at least one modular battery nacelle to the at least one rotor nacelle housing and configured so that the at least one modular battery nacelle provides power to the at least one modular rotor nacelle;
    forming at least one modular control nacelle and configuring the at least one modular control nacelle to include;
        a control nacelle housing further comprising:
            at least one GPS receiver affixed to the at least one control nacelle housing; and
            at least one control nacelle connector formed on a periphery of the control nacelle housing for connecting the at least one modular control nacelle to the at least one modular rotor nacelle or the at least one battery nacelle and configured to allow the at least one modular control to be powered by the at least one modular battery nacelle and to send at least one command to the at least one modular rotor nacelle;
    wherein the at least one modular rotor nacelle, the at least one modular battery nacelle, and the at least one modular control nacelle are connected to at least one other of the at least one modular rotor nacelle, the at least one modular battery nacelle, and the at least one modular control nacelle; and wherein the at least one modular rotor nacelle, the at least one modular battery nacelle, and the at least one modular control nacelle do not have identical components nor do they have identical function with respect to one another.

12. The method for forming a modular drone of claim 11, further comprising configuring the rotor nacelle housing, the battery nacelle housing, and the control nacelle housing to define a polygon shape as a periphery of the rotor nacelle housing, the battery nacelle housing, and the control nacelle housing.

13. The method for forming a modular drone of claim 11, further comprising:
  forming at least one modular utility nacelle configured to include;
  at least one utility nacelle housing further comprising;
    at least one camera affixed to the at least one modular utility nacelle housing;
    at least one utility nacelle connector formed on a periphery of the at least one modular utility nacelle for connecting the at least one modular utility nacelle to either the at least one modular rotor nacelle, the at least one modular battery nacelle, or the at least one modular control nacelle; and
  the at least one utility nacelle connector configured to:
    receive power from the at least one modular battery nacelle; and
    receive at least one command from the at least one modular command nacelle.

14. The method for forming a modular drone of claim 11, further comprising configuring the modular drone to include at least two modular rotor nacelles.

15. The method for forming a modular drone of claim 11, further comprising configuring the modular drone to include at least two modular command nacelles.

16. The method for forming a modular drone of claim 11, further comprising configuring the modular drone to include at least two modular battery nacelles.

17. The method for forming a modular drone of claim 12, further comprising configuring the at least one modular control nacelle with at least one modular rotor nacelle affixed to every side of the control nacelle housing.

18. The method for forming a modular drone of claim 11, further comprising configuring at least two modular rotor nacelles wherein a first of the at least two modular rotor nacelles is affixed to the at least one control nacelle and a second of the at least two modular rotor nacelles is connected to the first of the at least two motor nacelles but not connected to the at least one modular control nacelle.

19. The method for forming a modular drone of claim 11, further comprising configuring the at least one modular command nacelle to include at least one environmental sensor, at least one transponder, at least one data transceiver, at least one radio transceiver, at least one computer control component, or at least one altitude sensor.

20. The method for forming a modular drone of claim 13, further comprising configuring the at least one modular utility nacelle to include at least one camera support and at least one camera gimble.

* * * * *